US011027724B2

(12) United States Patent
Kim

(10) Patent No.: US 11,027,724 B2
(45) Date of Patent: Jun. 8, 2021

(54) PARKING ASSISTANCE SYSTEM AND PARKING ASSISTANCE METHOD

(71) Applicant: MANDO CORPORATION, Pyeongtaek-si (KR)

(72) Inventor: Jae Suk Kim, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 405 days.

(21) Appl. No.: 15/802,194

(22) Filed: Nov. 2, 2017

(65) Prior Publication Data

US 2018/0118197 A1 May 3, 2018

(30) Foreign Application Priority Data

Nov. 2, 2016 (KR) .......................... 10-2016-0145388

(51) Int. Cl.
*B60W 30/06* (2006.01)
*B60W 40/076* (2012.01)
*B60W 50/14* (2020.01)

(52) U.S. Cl.
CPC .......... *B60W 30/06* (2013.01); *B60W 40/076* (2013.01); *B60W 50/14* (2013.01); *B60W 2050/146* (2013.01); *B60W 2520/04* (2013.01); *B60W 2520/28* (2013.01); *B60W 2552/15* (2020.02); *B60W 2710/202* (2013.01)

(58) Field of Classification Search
CPC .... B60W 30/06; B60W 40/076; B60W 50/14; B60W 2050/146; B60W 2520/04; B60W 2520/28; B60W 2550/142; B60W 2710/202

See application file for complete search history.

(56) References Cited

U.S. PATENT DOCUMENTS 9,230,440 B1* 1/2016 Penilla ............... G06Q 30/0282
2007/0173984 A1* 7/2007 Nakayama ............... B60T 7/12
701/1

(Continued)

Primary Examiner — Thomas E Worden
(74) Attorney, Agent, or Firm — Morgan, Lewis & Bockius LLP

(57) ABSTRACT

The present disclosure relates to a parking assistance system for searching for a parking space and parking a vehicle in the parking space, which includes: a determinator configured to determine whether or not the vehicle is in a stopped state based on movement information of the vehicle; a calculator configured to calculate inclination information, which is an inclination of the vehicle or road surface on which the vehicle is located, using an inclination sensor included in the vehicle; a memory configured to store traveling information including first inclination information when the first inclination information calculated by the calculator is less than predetermined threshold inclination information in a parking space searching step, and configured to maintain the first inclination information or update the traveling information by changing the first inclination information into second inclination information based on at least one of a stopped time during which the vehicle remains stopped and the second inclination information measured during the stopped time in a parking step in which parking is processed; and a controller configured to control the vehicle to move toward the parking space based on the traveling information stored in the memory.

12 Claims, 6 Drawing Sheets

(56) References Cited

U.S. PATENT DOCUMENTS

| | | | | |
|---|---|---|---|---|
| 2010/0235053 A1* | 9/2010 | Iwakiri | ................ | B62D 15/027 |
| | | | | 701/42 |
| 2011/0178666 A1* | 7/2011 | Marcus | ............... | B60L 15/2009 |
| | | | | 701/22 |
| 2014/0136072 A1* | 5/2014 | Lima Ramirez | ...... | B60W 10/04 |
| | | | | 701/82 |
| 2016/0016564 A1* | 1/2016 | Otake | ............... | B60W 40/1005 |
| | | | | 701/75 |
| 2016/0114796 A1* | 4/2016 | Stefan | ................... | B60W 50/14 |
| | | | | 701/23 |
| 2016/0304088 A1* | 10/2016 | Barth | ........................ | B60T 7/22 |
| 2016/0332667 A1* | 11/2016 | Fendt | .................... | B60W 30/06 |
| 2017/0144650 A1* | 5/2017 | Nagamiya | .............. | B60K 6/445 |
| 2018/0093662 A1* | 4/2018 | Kim | ....................... | B60K 35/00 |
| 2018/0222456 A1* | 8/2018 | Lin | ......................... | B60T 8/172 |
| 2019/0161084 A1* | 5/2019 | Greenwood | ........... | B62D 13/06 |

\* cited by examiner

PARKING ASSISTANCE SYSTEM AND PARKING ASSISTANCE METHOD

CROSS REFERENCE TO RELATED APPLICATION

This application claims priority from Korean Patent Application No. 10-2016-0145388, filed on Nov. 2, 2016, which is hereby incorporated by reference for all purposes as if fully set forth herein.

BACKGROUND OF THE INVENTION

1. Field of the Invention

The present embodiments relate to parking assistance technology.

2. Description of the Prior Art

A general parking assistance system assists a user or a driver in parking a vehicle more easily and conveniently. The parking assistance system recognizes a parking space by means of sensors mounted on the vehicle, and calculates an optimum path for parking the vehicle in the recognized parking space in order to thereby automatically control a steering wheel or in order to thereby assist the driver in turning the steering wheel in an audiovisual manner.

A parking assistance system based on ultrasonic sensors has been introduced in the art as an example of a typical parking assistance system. Such an ultrasonic sensor-based parking assistance system recognizes surrounding obstacles and a parking space through ultrasonic signals and creates a movement path for the vehicle.

However, in the case of using the general parking assistance system, the vehicle may be pulled downwards on a slope to thereby collide with an obstacle or to thereby deviate from the movement path for the vehicle, which is initially set, or the vehicle may become stuck on a steep slope. In such a case, the general parking assistance system faces obstacles in assisting normal parking.

SUMMARY OF THE INVENTION

In this background, an objective of the present embodiments is to provide a parking assistance technique, which enables normal parking on the slope.

Another objective of the present embodiments is to provide a technique for effectively assisting parking on the slope by continuously updating and managing inclination information of the road on the parking guide path in the parking assistance system.

According to one aspect, the present embodiment provides a parking assistance system of a vehicle, which includes: a determinator configured to determine whether or not the vehicle is in a stopped state based on information detected by a sensor included in the vehicle; a calculator configured to calculate inclination information, which is the inclination of the vehicle or the road surface on which the vehicle is located, using an inclination sensor included in the vehicle, when the vehicle is determined to be in a stopped state; a memory configured to store traveling information including first inclination information when the first inclination information calculated by the calculator is less than predetermined threshold inclination information in a parking space searching step, and further configured to maintain the first inclination information or update the traveling information by changing the first inclination information into second inclination information based on at least one of a stopped time during which the vehicle remains stopped and the second inclination information measured during the stopped time in a parking step in which parking is processed; and a controller configured to control the vehicle to move toward the parking space based on the traveling information stored in the memory.

According to another aspect thereof, there is provided a parking assistance method including: a determination step of determining whether or not the vehicle is in a stopped state based on movement information of the vehicle; a calculation step of calculating inclination information, which is the inclination of the vehicle or the road surface on which the vehicle is located, using an inclination sensor included in the vehicle, when the vehicle is determined to be in a stopped state; a storage step of storing traveling information including first inclination information when the first inclination information calculated by the calculator is less than predetermined threshold inclination information in a parking space searching step, and of maintaining the first inclination information or updating the traveling information by changing the first inclination information into second inclination information based on at least one of a stopped time during which the vehicle remains stopped and the second inclination information measured during the stopped time in a parking step in which the parking is processed; and a control step of controlling the vehicle to move toward a parking space based on the traveling information stored in a memory.

As will be described below, according to the present embodiments, it is possible to park the vehicle in a parking space that is normally detected even if the vehicle is located on a slope.

In addition, it is possible to perform accurate parking control of the vehicle using the parking assistance system according to the present embodiment even when there is an inclined plane of less than a specific level in the parking path during the parking assistance process. Further, it is possible to deal with an error that occurs in an inclination sensor for measuring the inclination of the road surface.

BRIEF DESCRIPTION OF THE DRAWINGS

The above and other objects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
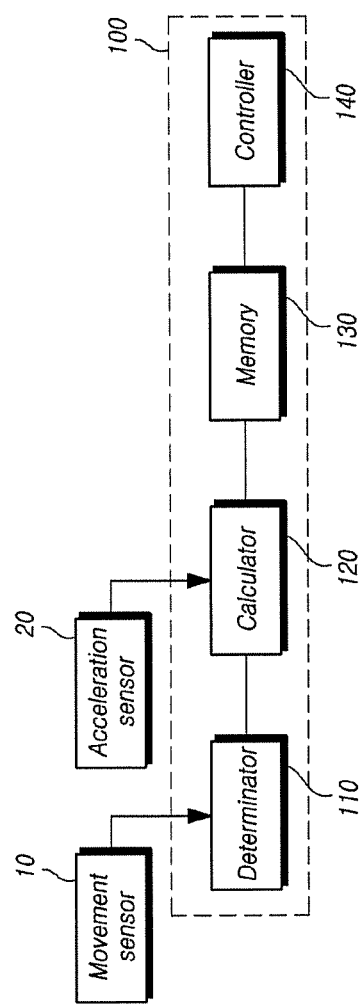
FIG. 1 is a view illustrating the configuration of a parking assistance system according to an embodiment.

Hereinafter, some embodiments will be described with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element Typical parking assistance systems including an SPAS (smart parking assist system) are techniques for simply detecting obstacles around a vehicle and for parking the vehicle in a parking space where no obstacle is detected around the vehicle by controlling the vehicle.

The general parking assistance systems have limitations in assisting with normal parking because the vehicle is forced to move downwards on a slope to thereby collide with an obstacle or because the vehicle is stuck on the slope.

Hereinafter, a detailed description of the present disclosure will be made of a parking assistance system and a parking assistance method for determining a slope and performing additional operations on the slope in order to thereby solve the above-mentioned problems.

FIG. 1 is a view illustrating the configuration of a parking assistance system according to an embodiment.

Referring to FIG. 1, a parking assistance system 100, according to an embodiment, may be configured to include: a determinator 110 for determining whether or not a vehicle is in a stopped state based on information detected by a vehicle movement detecting sensor such as a movement sensor 10 included in the vehicle; a calculator 120 for calculating inclination information, which is the inclination of a vehicle or road surface on which the vehicle is located, using an inclination sensor when the vehicle is determined to be in a stopped state; a memory 130 for managing traveling information for parking assistance based on the stopped time of the vehicle and inclination information measured during the stopped time at the beginning of the parking assistance and during the parking assistance process; and a controller 140 for controlling the vehicle based on the traveling information stored in the memory so that the vehicle moves to a parking space.

Although it is not shown in FIG. 1, the parking assistance system may further include a notification provider for notifying the driver that it is impossible to park the vehicle in the parking space when the inclination information calculated by the calculator 120 is equal to or greater than predetermined threshold inclination information.

The determinator 110 of the parking assistance system 100 according to an embodiment may determine whether or not the vehicle is in a stopped state based on movement information detected by the movement sensor 10 capable of sensing the movement of the vehicle.

The movement sensor 10 may include a speed sensor capable of detecting a vehicle speed and a wheel sensor for detecting the movement of a wheel to thereby output wheel pulses, but the present embodiments are not limited thereto, and all sensors that are able to detect the moving or stopped state of the vehicle while being included in the vehicle may be adopted.

The determinator 110 may determine that the vehicle is in a stopped state if the vehicle speed is not detected by the speed sensor or if a wheel pulse is not output from the wheel sensor.

The calculator 120 of the parking assistance system 100 according to an embodiment may calculate inclination information of a road surface on which the vehicle is located based on acceleration information detected by an acceleration sensor 20, which can be used as an inclination sensor, when the vehicle is determined to be in a stopped state.

The term "inclination information" in the present specification means the inclination of a vehicle with respect to the horizontal plane or means the inclination of the road surface on which the vehicle is located.

In the present embodiment, the inclination sensor is intended to measure the inclination information of the vehicle or road surface while the vehicle is stopped, which may be implemented by the acceleration sensor 20.

Although the acceleration sensor 20 will be described as an example of the inclination sensor hereinafter, the present embodiments are not limited thereto.

Meanwhile, the acceleration sensor 20 may include a G-sensor capable of detecting left or right turning, traveling, and stopping of the vehicle, and uphill and downhill roads.

The calculator 120 may calculate inclination information by using G-sensor information detected by the G-sensor as an acceleration sensor and a predetermined data map (for example, a data map for outputting the inclination information by inputting the G-sensor information).

That is, the present embodiment may use a predetermined map or equation that can convert a G-sensor value detected by the G-sensor into a corresponding inclination or inclination information, and the conversion between a G-sensor value of the vehicle and the inclination information is well known, and thus a detailed description thereof will be omitted.

The memory 130 of the parking assistance system 100 according to an embodiment performs a function of creating traveling information for parking assistance including inclination information fundamentally based on the inclination information of the vehicle or road surface, which is measured while the vehicle stops, or a function of updating the same.

Hereinafter, the operation of the memory 130 of the parking assistance system 100 according to the present embodiment will be described in more detail.

The memory 130 of the parking assistance system 100 may store first inclination information, which is calculated in an initial step, as a part of the traveling information for parking assistance if the first inclination information is less than predetermined threshold inclination information.

The initial step may refer to a step of starting the parking assistance system or a step of searching for a parking space, in which traveling information is not yet stored, and the threshold inclination information may be a threshold value of inclination information at which the vehicle may be forced to move downwards.

In addition, in the next step, the memory 130 may maintain the first inclination information, or may change the first inclination information into second inclination information in order to thereby update the traveling information based on at least one of a stopped time, during which the vehicle remains stopped, and the second inclination information calculated while the vehicle is in a stopped state.

Here, the next step may refer to a state after the parking assistance of the vehicle is executed (that is, a parking step), but the present embodiments are not limited thereto, and the next step may mean all of the periods after the first inclination information is stored.

Accordingly, in the present specification, the initial step or the next step may mean a cycle in which the parking assistance system 100 according to an embodiment determines whether or not to perform update by judging the inclination information.

More specifically, the memory 130 may maintain the first inclination information stored in the previous step without changing the same when a stopped time during which the vehicle remains stopped is less than a predetermined first threshold time in the parking step.

At this time, the first threshold time may be set based on oscillation information of the acceleration sensor 20, and may be a threshold value of time during which the oscillation of the acceleration sensor 20 is reduced so that reliable acceleration information can be obtained.

That is, the memory 130 of the present embodiment basically measures the inclination information every time the vehicle stops after the parking assistance is started in order to thereby reflect the same to a traveling path for parking assistance. However, the memory 130 may not perform the measurement of inclination information or the reflection thereof with respect to the traveling path when the stopped time is too short to ensure the reliability of measurement by the acceleration sensor, functioning as an inclination sensor, even when the vehicle is stopped.

On the other hand, if the stopped time during which the vehicle remains stopped is equal to or greater than the first threshold time in the next step, the memory may update the traveling information with second inclination information that is measured during the time. That is, the first inclination information, which is stored to be included in the traveling information in the previous step, is changed into the second inclination information.

Of course, the update of the traveling path may be performed only when the second inclination information is less than the threshold inclination information in this case as well, and it is possible to give an alarm indicating that parking assistance cannot be performed when the second inclination information is greater than the threshold inclination information.

The acceleration sensor or the G-sensor, which is used as an inclination sensor in the present embodiment, may include a measurement error due to the inherent limitations of the sensor. Particularly, since the vehicle repeatedly moves backward and forward and stops during the parking assistance process to which the present embodiment is applied, it is necessary to be prepared for the measurement error of the inclination sensor.

Therefore, in order to maintain the reliability of measurement by the inclination sensor in the present embodiment, it is possible to determine whether or not to update the inclination information based on a deviation value, which is the difference between the first inclination information and the second inclination information, and the coidentity of signs of the first inclination information and the second inclination information, as well as the stopped time of the vehicle in the parking step, as conditions for updating the inclination information.

Hereinafter, the update configuration of inclination information considering the reliability of the inclination sensor will be described in detail.

First, the memory 130 may maintain the first inclination information, which is stored in advance, without updating the same with the second inclination information when a deviation between the second inclination information, which is measured during the stopped time of the vehicle, and the first inclination information, which is measured and stored in the previous step, is equal to or greater than a specific value even if the stopped time during which the vehicle remains stopped is equal to or greater than the first threshold time, which is set based on the oscillation information.

That is, the memory may maintain the traveling information reflecting the first inclination information stored in the previous step when a deviation, which is a difference value between the second inclination information measured during the stopped time and the first inclination information measured in the previous step (in the parking space searching step or during the stopped time prior to the parking process), is equal to or greater than a predetermined threshold deviation, and may update the traveling information by changing the first inclination information included in the traveling information into the second inclination information when the deviation between the first inclination information and the second inclination information is less than the threshold deviation.

At this time, the threshold deviation, which is a threshold value for determining whether or not two pieces of inclination information calculated at an interval of time or acceleration information for the measurement thereof are reliable, may be set in advance through experimentation.

As described above, it is possible to configure the traveling information including accurate inclination information by reflecting the time deviation of the inclination information even when the vehicle makes a sudden stop or the vehicle alternates between moving and stopping.

As another example, even if the stopped time during which the vehicle remains stopped is equal to or greater than a predetermined first threshold time, the memory 130 may maintain the first inclination information stored in the previous step when the sign of the second inclination information measured during the stopped time of the vehicle does not remain the same as the sign of the first inclination information measured and stored in the previous step.

Generally, the inclination information measured by the inclination sensor or acceleration sensor (G-sensor) has a positive or negative sign depending on the direction of inclination. For example, the inclination information may have a positive sign when the front of a vehicle is relatively low, and the inclination information may have a negative sign when the front of a vehicle is relatively high.

However, the inclination of the traveling path generally has the same sign throughout the process from the start of the parking assistance to the end thereof.

Accordingly, the memory 130 may: compare the sign of the second inclination information, measured during the stopped time of the parking step, and the first inclination information, measured in the previous step (in the parking space searching step or during the stopped time prior to the parking process); maintain the first inclination information included in the traveling information when the signs of the first inclination information and the second inclination information are different from each other; and update the traveling information by changing the first inclination information included in the traveling information into the second inclination information when the signs of the first inclination information and the second inclination information are the same.

As described above, in the case where the direction of inclination is changed in the parking process, it is possible to be prepared for an error of the inclination sensor by not compensating for the degree of inclination.

The controller 140 of the parking assistance system 100 according to an embodiment performs a function of controlling the vehicle based on the traveling information stored in the memory so that the vehicle moves to the parking space.

More specifically, the controller 140 calculates an engine driving torque (that is, a traveling torque) and a steering torque of the vehicle based on the stored traveling information, and controls the vehicle to enter the parking space based on the same.

Of course, in the case of a fully automatic parking assistance system, the controller 140 completely controls the steering direction and traveling torque of the vehicle from the start of parking to the end thereof. In the case of a semi-automatic parking assistance system, the controller 140 may automatically control only a steering system of the vehicle, and may display guidance information on the driver's engine driving (moving backward and forward, and stopping).

Meanwhile, the engine driving torque controlled by the controller 140 may be calculated by further reflecting a compensating driving torque, which is reflected with the inclination information according to the present embodiment, in addition to the basic driving torque corresponding to an even road.

That is, the engine driving torque in the parking process according to the present embodiment may be taken as the sum of a basic driving torque, which is output from the existing parking assistance system, and a compensating driving torque reflecting the inclination output from the controller 140.

Meanwhile, the determinator 110, the calculator 120, the memory 130, and the controller 140 included in the parking assistance system 100 according to the present embodiment may be implemented as a partial module of an integrated control device or ECU installed in the vehicle.

The integrated control device or ECU of the vehicle may include a processor, a storage device, such as a memory, and a computer program capable of performing a specific function. In addition, the determinator 110, the calculator 120, the memory 130, and the controller 140 of the parking assistance system 100 described above may be implemented as software modules capable of performing respective inherent functions.

Further, the inclination sensor included in the parking assistance system 100 according to the present embodiment may include an acceleration sensor or a G-sensor.

As described above, according to the parking assistance system 100 in an embodiment, it is possible to park a vehicle in a parking space that is detected normally even if the vehicle is located on a slope.

In addition, by using the parking assistance system according to the present embodiment, it is possible to perform accurate parking control of the vehicle even when there is an inclined plane of less than a specific level in the parking path during the parking assistance process, and it is possible to deal with an error occurring in the inclination sensor that measures the inclination of the road surface.

Hereinafter, the operation of the parking assistance system 100 according to an embodiment will be described in detail with reference to FIGS. 2 to 4.

Figure 2:
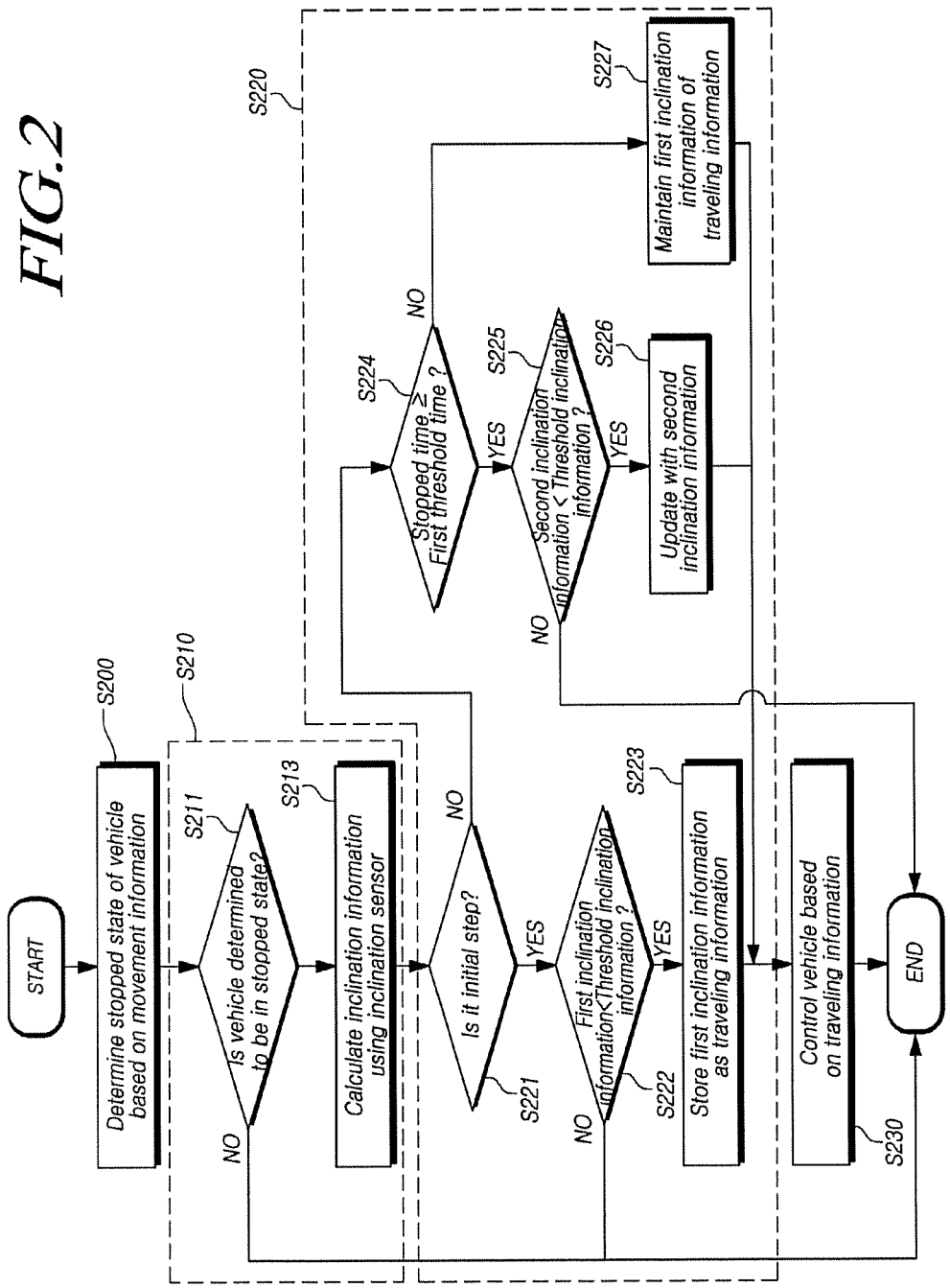
FIG. 2 is a view for explaining the operation of a parking assistance system according to an embodiment.

FIG. 2 is a view illustrating a first example for explaining the operation of a parking assistance system according to an embodiment.

Referring to FIG. 2, a determinator of a parking assistance system according to an embodiment may determine whether or not a vehicle is in a stopped state based on movement information detected by a movement sensor (S200). The movement sensor may include a speed sensor capable of detecting a vehicle speed, a wheel sensor for detecting the movement of a wheel to thereby output a wheel pulse, and the like. Accordingly, the determinator may determine that the vehicle is in a stopped state when no vehicle speed is detected by the speed sensor or when no wheel pulse is output from the wheel sensor.

Thereafter, the calculator of the parking assistance system according to an embodiment may identify whether or not the vehicle is determined to be in a stopped state in step S200 (S211).

If it is identified that the vehicle is in a stopped state (YES) in step S211, the calculator may calculate first inclination information based on information detected by an acceleration sensor (G-sensor) (S213). The acceleration sensor may include a G-sensor capable of detecting left or right turning, traveling, and stopping, of the vehicle, and uphill and downhill roads. Thus, the calculator may calculate inclination information using G-sensor information detected by the G-sensor based on a predetermined data map (for example, a data map for outputting the inclination information by inputting the G-sensor information).

As described above, when the calculator completes step S210 including steps S211 and S213, the memory of the parking assistance system according to an embodiment may determine whether or not it is an initial step for searching for a parking space (S221). The initial step may refer to a step in which the parking assistance system starts, and may be the state in which traveling information is not yet stored. Accordingly, the initial step may be determined depending on whether or not the traveling information is stored in step S221.

If the determination is identified as being YES in step S221, the memory may determine whether or not the calculated first inclination information is less than predetermined threshold inclination information, and if it is YES, the memory may include the inclination information in the traveling information and then store the same (S223). On the other hand, if it is determined that the inclination information is greater than the threshold inclination information (NO) in step S222, the parking assistance system may be terminated after the parking disablement message is output without further performing the parking assistance operation.

If it is identified that the vehicle is currently in a stopped state in the parking process, rather than in the initial step (NO) in step S221, the memory determines whether or not the stopped time during which the vehicle remains stopped is equal to or greater than a predetermined first threshold time (S224). If the stopped time is equal to or greater than the first threshold time (YES), the memory determines again whether or not the second inclination information, calculated and measured during the time, is less than predetermined threshold inclination information (S225). Step S225 may be the same as step S222.

If the second inclination information during the stopped time is less than the threshold inclination information (YES) in step S225, the memory may update the traveling information by changing the first inclination information included in the traveling information into the second inclination information (S226).

On the other hand, if the stopped time of the vehicle is less than the first threshold time (NO) in step S224, the memory may maintain the traveling information reflecting the first inclination information stored in the previous operation period (S227).

As described above, when the memory performs step S220 including steps S221 to S227 in order to thereby determine the traveling information, the controller of the parking assistance system according to an embodiment controls the vehicle based on the determined traveling information. That is, the controller may calculate parking control values, such as an engine driving torque and a steering torque, based on the stored traveling information, and may control the vehicle based on the calculated parking control values (S230).

Meanwhile, the memory of the parking assistance system according to an embodiment may maintain the traveling information, or may update the traveling information with the inclination information further based on deviation of the acceleration information even if the stopped time during which the vehicle remains stopped is less than the first threshold time set based on the oscillation information.

Meanwhile, a measurement deviation value of the inclination information over time may be further considered in addition to the stopped time of the vehicle in the process of updating the inclination information, which will be described in detail as a second example with reference to FIG. 3.

Figure 3:
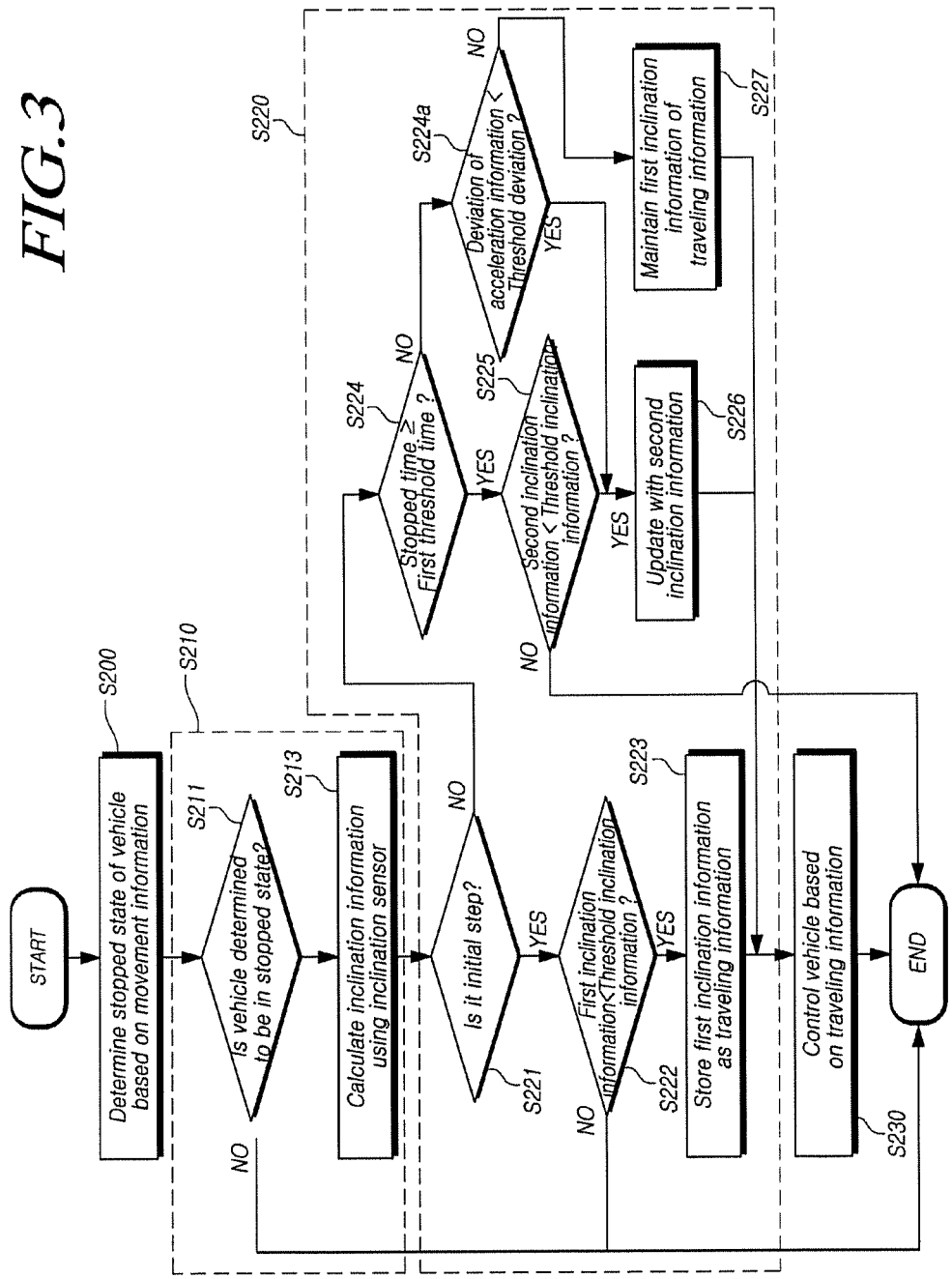
FIG. 3 is a view for explaining the operation of a parking assistance system according to another embodiment.

FIG. 3 is a view illustrating an embodiment in which a deviation value of inclination information is further considered, and since the remaining configurations except for those of step S220 are the same as those described in connection with FIG. 2, a detailed description thereof will be omitted to avoid redundancy.

Referring to FIG. 3, if it is determined that the stopped time of the vehicle is less than the first threshold time in the parking process (NO) in step S224, the memory may determine whether or not a deviation, which is the difference between the second inclination information measured during the stopped time of the vehicle and the previously stored first inclination information, is less than a predetermined threshold deviation (S224a).

Next, if it is determined that the deviation of the inclination information is less than the predetermined threshold deviation (YES) in step S224a, the memory may update the first inclination information included in the traveling information with the second inclination information in step S226. The threshold deviation is a value for determining whether or not the measured inclination information is reliable, and may be set in advance through experimentation.

On the other hand, if the deviation between the first inclination information and the second inclination information is greater than the threshold deviation (NO) in step S224a, the memory may maintain the first inclination information included in the traveling information (S227).

Meanwhile, a change in the sign of the inclination information may be further considered in addition to the stopped time of the vehicle and the deviation value of the inclination information in the course of updating the inclination information, which will be described in detail as a third example with reference to FIG. 4.

Figure 4:
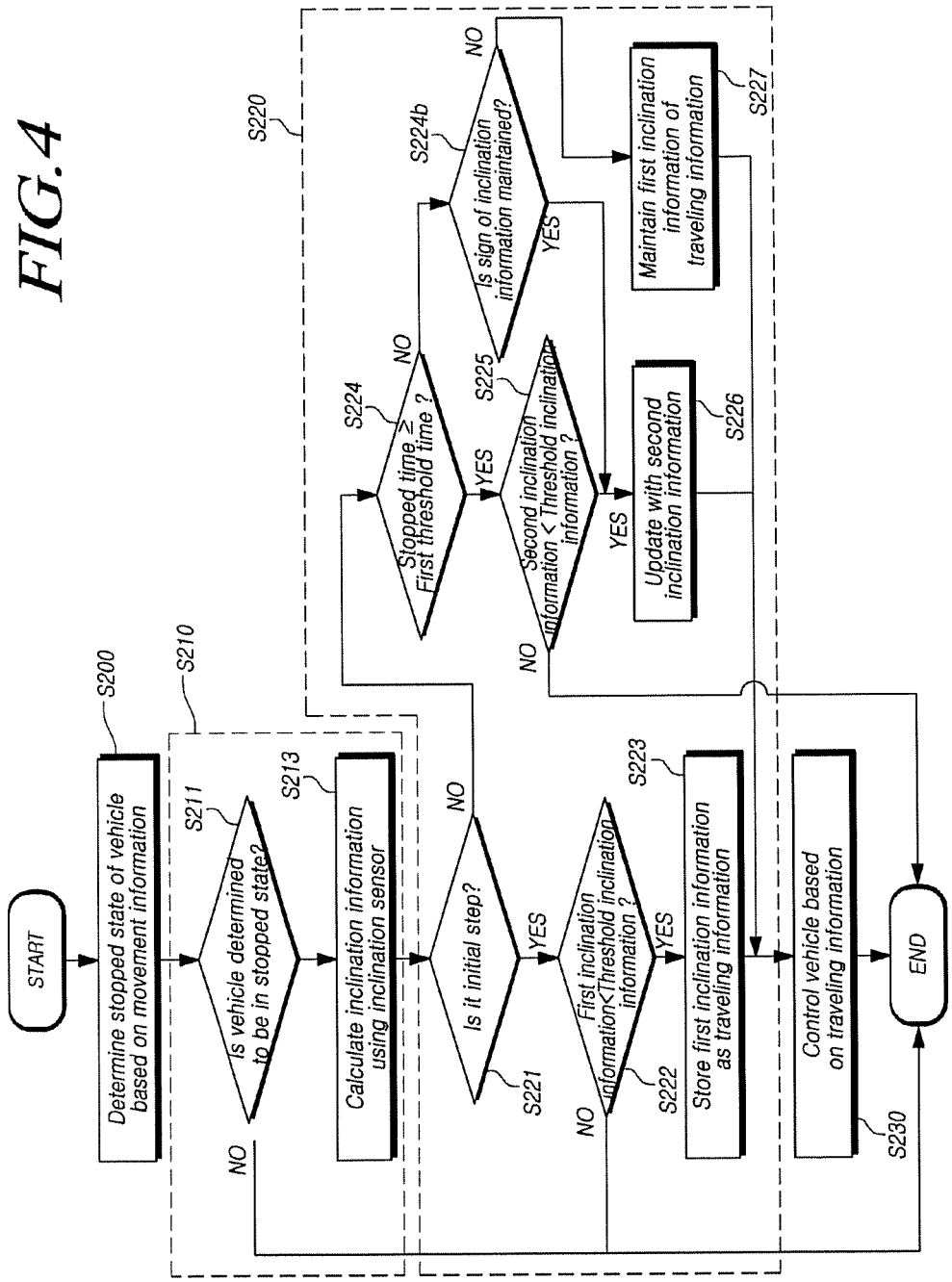
FIG. 4 is a view for explaining the operation of a parking assistance system according to another embodiment.

FIG. 4 is a view illustrating an embodiment in which a change in the sign of the inclination information is further considered, and since the remaining configurations except for those of step S220 are the same as those described in connection with FIG. 2, a detailed description thereof will be omitted in order to avoid redundancy.

Referring to FIG. 4, if it is determined that the stopped time is less than the first threshold time (NO) in step S224, the memory may further determine whether or not the sign of the inclination information is maintained (S224b). That is, in step S224b, the memory determines whether or not the sign of the second inclination information measured during the stopped time is the same as that of the previously stored first inclination information.

Next, if it is determined that the sign of the second inclination information is the same as that of the first inclination information (that is, if the sign of the inclination information is maintained) (YES) in step S224b, the memory may change the previously stored first inclination information into the second inclination information, or may update the traveling information so as to reflect the second inclination information in step S226.

On the other hand, if it is determined that the sign of the second inclination information is different from that of the first inclination information (that is, if the sign of the inclination information is not maintained) (NO) in step S224b, the memory may maintain the traveling information reflecting the first inclination information, which was stored in the previous step, in step S227.

In describing the operations of FIGS. 3 and 4, a description of operations corresponding to those of FIG. 2 has been omitted. Therefore, the overall operation of FIGS. 3 and 4 can be understood with reference to the description of FIG. 2.

The parking assistance system according to an embodiment, which operates as shown in FIGS. 3 and 4, may configure traveling information for accurate parking assistance even when: the vehicle suddenly stops; the vehicle alternates between moving and stopping; or an error occurs in the inclination sensor in such an environment.

Accordingly, since the parking assistance system according to an embodiment can perform accurate parking control reflecting the degree of inclination even when there is an inclination of less than a specific level on the parking path, the parking assistance system can prevent the vehicle from being forced to move downwards due to the inclination of the road surface, and as a result, may improve the accuracy of the parking assistance system.

Particularly, the parking assistance system has an effect of providing accurate parking assistance even when a specific error occurs in the inclination sensor or the like using the stopped time of a vehicle, a deviation value of inclination information, or coidentity of signs of inclination information in the parking assist process reflecting the inclination. It is thus possible to park the vehicle in the parking space normally.

Meanwhile, the parking assistance system according to another embodiment may further include a notification provider indicating that it is impossible to park the vehicle in the parking space when the first inclination information or the second inclination information, which is calculated by the parking assistance system according to the embodiment shown in FIG. 1, is equal to or greater than predetermined threshold inclination information.

The notification provider, which is a device for informing the user of information, may be an HMI (Human Machine Interface) including a lamp for emitting light, a speaker for outputting sound, and a vibration device for outputting vibration.

Figure 5:
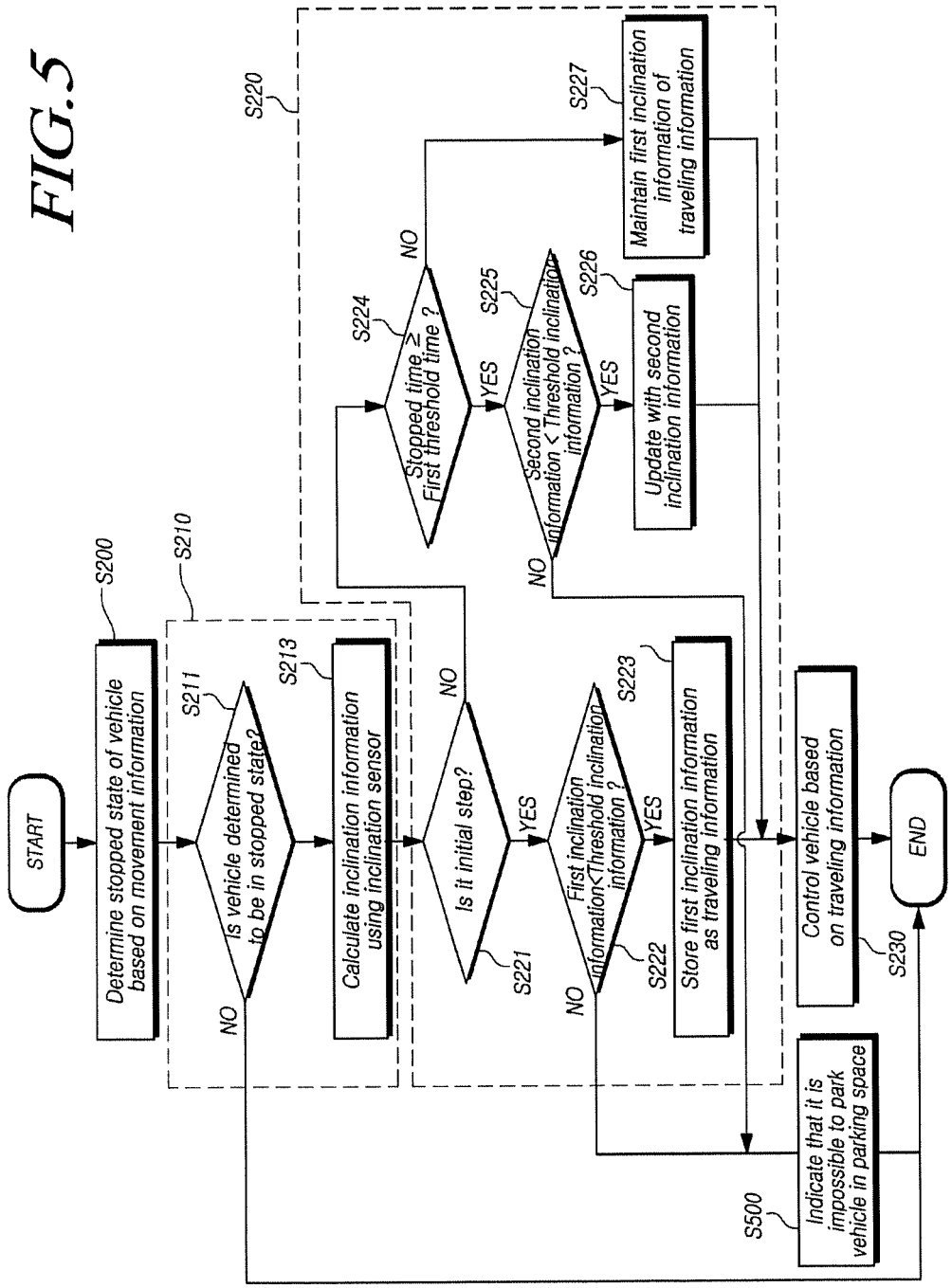
FIG. 5 is a view for explaining the operation of a parking assistance system according to another embodiment.

The operation above will be described in detail with reference to FIG. 5 illustrating a third example for explaining the operation of a parking assistance system according to another embodiment.

Referring to FIG. 5, if the memory determines that the calculated first inclination information is greater than the threshold inclination information (NO) in step S222, the notification provider of the parking assistance system according to another embodiment may indicate that it is impossible to park the vehicle in the found parking space and the parking assistance may be terminated (S500).

In addition, even when the second inclination information, which is calculated during the stopped time of the vehicle after the first inclination information is stored, is greater than the threshold inclination information (NO in step S225), the notification provider may indicate that it is impossible to park the vehicle in the found parking space and the parking assistance may be terminated (S500).

The parking assistance system according to another embodiment may park the vehicle in the normally found parking space even if the vehicle is located on a slope of less than a specific angle, and may inform the user of inability to provide parking assistance when the vehicle is located on a slope of more than a specific angle.

Accordingly, the user does not operate the parking assistance system on a slope of more than a specific angle so as to prevent a collision that may be caused if the vehicle is pulled downhill.

In the description of the operation of FIG. 5, the operations corresponding to those of FIG. 2, illustrating the operation of the parking assistance system according to an embodiment, will be omitted. Therefore, the overall operation of FIG. 5 may be understood with reference to the description of FIG. 2.

Hereinafter, a parking assistance method, which includes operations performed by the parking assistance system described with reference to FIGS. 1 to 5, will be briefly described.

Figure 6:
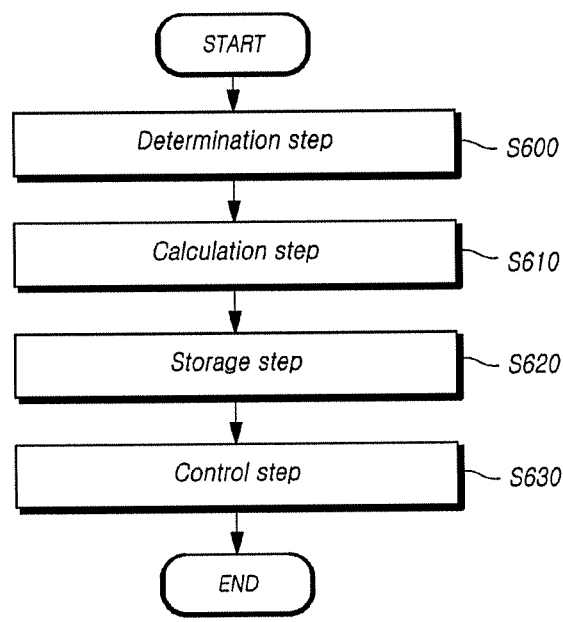
FIG. 6 is a flowchart illustrating a parking assistance method according to an embodiment.

FIG. 6 is a flowchart of a parking assistance method according to an embodiment.

Referring to FIG. 6, a parking assistance method for searching for a parking space and parking a vehicle in the parking space may include: a determination step (S600) of determining whether or not the vehicle is in a stopped state based on movement information detected by a movement sensor or the like; a calculation step (S610) of calculating inclination information based on acceleration information detected by an acceleration sensor when the vehicle is determined to be in a stopped state; a storage step (S620) of storing first inclination information as a part of traveling information when the first inclination information measured in an initial step (the parking space searching step) is less than predetermined threshold inclination information and of maintaining the stored traveling information or updating inclination information included in the traveling information based on a stopped time during which the vehicle remains stopped and second inclination information calculated during the time in a next parking step; and a control step (S630) of controlling the vehicle based on the stored traveling information.

In the determination step (S600) of the parking assistance method according to an embodiment, whether or not the vehicle is in a stopped state may be determined based on movement information detected by a movement sensor capable of sensing the movement of a vehicle.

The movement sensor may include a speed sensor capable of detecting a vehicle speed and a wheel sensor for detecting the movement of a wheel to thereby output wheel pulses. Therefore, in the determination step (S600), it is possible to determine that the vehicle is in a stopped state if the vehicle speed is not detected by the speed sensor or if a wheel pulse is not output from the wheel sensor.

In the calculation step (S610) of the parking assistance method according to an embodiment, if the vehicle is determined to be in a stopped state, inclination information of a road surface on which the vehicle is located may be calculated based on acceleration information detected by an acceleration sensor (G-sensor) that can be used as an inclination sensor.

The acceleration sensor may include a G-sensor capable of detecting left or right turning, travelling, and stopping of a vehicle, and uphill and downhill roads. Thus, in the calculation step (S610), inclination information may be calculated by using G-sensor information detected by the G-sensor and a predetermined data map (for example, a data map for outputting the inclination information by inputting the G-sensor information).

In the storage step (S620) of the parking assistance method according to an embodiment, if first inclination information calculated in the initial step is less than predetermined threshold inclination information, the first inclination information may be stored, or traveling information reflecting the first inclination information may be stored.

The initial step, which is a step of starting the parking assistance system, may mean a step of searching for a parking space, for which the traveling information is not yet stored, and the threshold inclination information may be a threshold value of inclination information at which the vehicle may be forced to move downwards.

In addition, in the storage step (S620), the inclination information or traveling information, which is stored in the previous step (including the initial step), may be maintained, or the inclination information or traveling information, which is stored in the previous step, may be updated with new inclination information or traveling information based on a stopped time, during which the vehicle remains stopped, and second inclination information calculated during the stopped time in the parking assistance step after the initial step. The one step mentioned herein may refer to a one-cycle operation of the parking assistance method according to an embodiment.

Thus, in the storage step (S620), the first inclination information stored in the previous step or the traveling information reflecting the first inclination information may be maintained if the stopped time during which the vehicle remains stopped is less than a predetermined first threshold time.

The first threshold time may be set based on oscillation information of an acceleration sensor, which is an inclination sensor, and may be a threshold value of the time during which the oscillation of the acceleration sensor is reduced so that reliable acceleration information can be obtained.

On the other hand, if the stopped time during which the vehicle remains stopped is equal to or greater than the first threshold time, the inclination information or traveling information may be updated with second inclination information measured during the time.

Alternatively, in the storage step (S620), even if the stopped time during which the vehicle remains stopped is equal to or greater than the first threshold time set based on the oscillation information in the next step, the inclination information may be maintained or updated, instead of directly updating the same with new second inclination information, by considering a deviation value or coidentity of signs with respect to the previously stored first inclination information.

For example, in the storage step (S620), even if the stopped time, during which the vehicle remains stopped in the parking process, is equal to or greater than a first threshold time, set based on the oscillation information, the first inclination information stored in the previous step or the traveling information reflecting the same may be maintained when a deviation, which is a difference value between the second inclination information measured during the stopped time and the pre-stored first inclination information, is equal to or greater than a predetermined threshold deviation, and the first inclination information or the traveling information may be updated with the second inclination information when the deviation of the inclination information is less than the threshold deviation.

The threshold deviation, which is a value for determining whether or not the acceleration information is reliable, may be set in advance through experimentation. Therefore, it is possible to configure accurate traveling information even when the vehicle makes a sudden stop or the vehicle alternates between moving and stopping.

As another example, in the storage step (S620), even if the stopped time during which the vehicle remains stopped in the parking assistance process is equal to or greater than the first threshold time, the first inclination information stored in the previous step may be maintained when the sign of the second inclination information measured during the stopped time is different from the sign of the previously stored first inclination information, and the inclination information or traveling information may be updated with the second inclination information when the sign of the second inclination information remains the same as the sign of the first inclination information. Therefore, it is possible to configure accurate traveling information even when the vehicle makes a sudden stop or the vehicle frequently alternates between moving and stopping.

In the control step (S630) of the parking assistance method according to an embodiment, a vehicle engine driving torque and/or a steering torque necessary for parking may be calculated based on the stored traveling information, and an operation of parking the vehicle in the parking space (i.e., the overall operation of the parking assistance system) may be performed.

As described above, according to the parking assistance method in the embodiment, it is possible to park the vehicle in the parking space, which is normally searched for, even if the vehicle is located on a slope.

Furthermore, the parking assistance method can perform all of the operations performed by the parking assistance system, which have been described with reference to FIGS. 1 to 5.

As described above, the present embodiment has an effect of parking the vehicle in a parking space that has been normally found even if the vehicle is located on the slope.

In addition, using the parking assistance system according to the present embodiment, it is possible to perform accurate parking control of the vehicle even when there is an inclined plane of less than a specific level in the parking path during the parking assistance process, and it is possible to deal with an error that occurs in an inclination sensor for measuring the inclination of the road surface.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A parking assistance system of a vehicle, the system comprising:
   a processor configured to:
   determine whether or not the vehicle is in a stopped state based on information detected by a sensor included in the vehicle,
   calculate current inclination information, which is an inclination of a road surface on which the vehicle is located, using an inclination sensor included in the vehicle, and identify the stopped state as a current stopped state, wherein the current inclination information is calculated based on sensor values measured at the current stopped state, wherein a current stopped time is a time duration for which the vehicle in the current stopped state remains stopped;
   a memory configured to:
   store the current inclination information as current traveling information when the current inclination information is less than predetermined threshold inclination information and previous traveling information is not stored in the memory, and
   maintain previous inclination information as the current traveling information or update the previous traveling information by changing the previous inclination information to the current inclination information, depending on whether or not the current stopped time is greater than or equal to a first threshold time, wherein the previous inclination information is calculated based on sensor values measured at a previous stopped state, wherein a previous stopped time is a time duration for which the vehicle in the previous stopped state remains stopped, wherein the vehicle does not remain stopped between the previous and current stopped states; and
   a controller configured to control the vehicle to move toward the parking space based on the current traveling information stored in the memory,
   herein the controller controls the vehicle to move toward the parking space based on an engine driving torque, the engine driving torque being calculated by adding a compensating driving torque to a basic driving torque corresponding to an even road,
   wherein the compensating driving torque is calculated based on the current traveling information, and changes as the current traveling information is updated, and
   wherein when the current stopped time is less than the first threshold time, the memory is further configured to:
   maintain the previous inclination information included in the previous traveling information when signs of the previous inclination information and the current inclination information are different from each other; and
   update the previous traveling information by changing the previous inclination information included in the previous traveling information into the current inclination information when the signs of the previous inclination information and the current inclination information are the same as each other.

2. The parking assistance system of claim 1, wherein the memory is further configured to
update the previous traveling information by changing the previous inclination information included in the previous traveling information to the current inclination information when the current stopped time is equal to or greater than the first threshold time and the current inclination information is less than the predetermined threshold inclination information.

3. The parking assistance system of claim 2, wherein the inclination sensor includes an acceleration sensor, and the first threshold time is set based on oscillation information of the acceleration sensor.

4. The parking assistance system of claim 1, wherein when the current stopped time is less than the first threshold time, the memory is further configured to:
maintain the previous inclination information included in the previous traveling information when a deviation, which is a difference between the previous inclination information and the current inclination information, is equal to or greater than a predetermined threshold deviation; and
update the previous traveling information by changing the previous inclination information included in the previous traveling information to the current inclination information when the deviation, which is the difference between the previous inclination information and the current inclination information, is less than the predetermined threshold deviation.

5. The parking assistance system of claim 1, wherein the memory is further configured to update the previous traveling information by changing the previous inclination information included in the previous traveling information to the current inclination information only when: the current stopped time is less than the first threshold time; a deviation, which is a difference between the previous inclination information and the current inclination information, is less than a predetermined threshold deviation; and signs of the previous inclination information and the current inclination information are the same as each other.

6. The parking assistance system of claim 1, further comprising a notification provider configured to indicate that it is impossible to park the vehicle in the parking space when the previous inclination information or the current inclination information calculated by the processor is greater than or equal to the predetermined threshold inclination information.

7. The parking assistance system of claim 1, wherein the controller is further configured to terminate the parking assistance system when the previous inclination information or the current inclination information calculated by the processor is greater than or equal to the predetermined threshold inclination information.

8. A parking assistance method for searching for a parking space and assisting a driver in parking a vehicle in the parking space, the method comprising:
determining whether or not the vehicle is in a stopped state based on movement information of the vehicle;
calculating current inclination information, which is an inclination of a road surface on which the vehicle is located, using an inclination sensor included in the vehicle, and identifying the stopped state as a current stopped state, wherein the current inclination information is calculated based on sensor values measured at the current stopped state, wherein a current stopped time is a time duration for which the vehicle in the current stopped state remains stopped;
storing the current inclination information as current traveling information when the current inclination information is less than predetermined threshold inclination and previous traveling information is not stored in the memory, and maintaining previous inclination information as the current traveling information or updating the previous traveling information by changing the previous inclination information to the current inclination information, depending on whether or not the current stopped time is greater than or equal to a first threshold time, wherein the previous inclination information is calculated based on sensor values measured at a previous stopped state, wherein a previous stopped time is a time duration for which the vehicle in the previous stopped state remains stopped, wherein the vehicle does not remain stopped between the previous and current stopped states; and
controlling the vehicle to move toward the parking space based on the current traveling information stored in a memory,
wherein the controlling comprises controlling the vehicle to move toward the parking space based on an engine driving torque, the engine driving torque being calculated by adding a compensating driving torque to a basic driving torque corresponding to an even road,
wherein the compensating driving torque is calculated based on the current traveling information, and changes as the current traveling information is updated, and
wherein when the current stopped time is less than the first threshold time, the storing comprises:
maintaining the previous inclination information included in the previous traveling information when signs of the previous inclination information and the current inclination information are different from each other; and
updating the previous traveling information by changing the previous inclination information included in the previous traveling information to the current inclination information when the signs of the first inclination information and the current inclination information are the same as each other.

9. The method of claim 8, wherein the storing further comprises
updating the previous traveling information by changing the previous inclination information included in the previous traveling information to the current inclination information when the current stopped time is equal to or greater than the first threshold time and the current inclination information is less than the predetermined threshold inclination information.

10. The method of claim 8, wherein when the current stopped time is less than the first threshold time, the storing further comprises:
maintaining the previous inclination information included in the previous traveling information when a deviation, which is a difference between the previous inclination information and the current inclination information, is equal to or greater than a predetermined threshold deviation; and
updating the previous traveling information by changing the previous inclination information included in the previous traveling information to the current inclination information when the deviation, which is the difference between the previous inclination information and the current inclination information, is less than the predetermined threshold deviation.

11. The method of claim 8, wherein the storing further comprises updating the previous traveling information by changing the previous inclination information included in the previous traveling information to the current inclination information only when: the current stopped time is less than the first threshold time; a deviation, which is the difference between the previous inclination information and the current inclination information, is less than a predetermined threshold deviation; and signs of the previous inclination information and the current inclination information are the same as each other.

12. The method of claim 8, further comprising terminating parking assistance when the previous inclination information or the current inclination information calculated by the processor is greater than or equal to the predetermined threshold inclination information.

* * * * *